United States Patent
Brierley

(10) Patent No.: US 11,031,849 B2
(45) Date of Patent: Jun. 8, 2021

(54) LINEAR MOTOR AND OPERATING METHOD THEREOF

(71) Applicant: Dunkermotoren GmbH, Schwarzwald (DE)

(72) Inventor: Adam Guy St Clair Brierley, Laindon (GB)

(73) Assignee: DUNKERMOTOREN GMBH, Bonndorf (DE)

( * ) Notice: Subject to any disclaimer, the term of this patent is extended or adjusted under 35 U.S.C. 154(b) by 93 days.

(21) Appl. No.: 16/294,818

(22) Filed: Mar. 6, 2019

(65) Prior Publication Data

US 2019/0280569 A1 Sep. 12, 2019

(30) Foreign Application Priority Data

Mar. 6, 2018 (DE) ...................... 10 2018 105 118.2

(51) Int. Cl.
*H02K 11/21* (2016.01)
*H02K 11/215* (2016.01)
*H02K 1/27* (2006.01)
*H02K 41/03* (2006.01)

(52) U.S. Cl.
CPC ......... *H02K 11/215* (2016.01); *H02K 1/2793* (2013.01); *H02K 41/031* (2013.01)

(58) Field of Classification Search
CPC .. H02K 11/215; H02K 1/2793; H02K 41/031; H02K 2213/03
USPC ........................................................ 310/12.19
See application file for complete search history.

(56) References Cited

U.S. PATENT DOCUMENTS

| | | | |
|---|---|---|---|
| 6,316,848 B1* | 11/2001 | Rohner | H02K 41/02 310/12.19 |
| 2008/0265826 A1* | 10/2008 | Sasaki | G01D 5/2457 318/687 |
| 2010/0072830 A1* | 3/2010 | Ausderau | G01D 5/145 310/12.19 |
| 2012/0223597 A1* | 9/2012 | Hosek | G01B 7/003 310/12.19 |
| 2015/0022030 A1* | 1/2015 | Rohner | H02K 41/02 310/12.19 |
| 2020/0161998 A1* | 5/2020 | Kim | H02P 25/06 |

* cited by examiner

*Primary Examiner* — Michael Andrews
(74) *Attorney, Agent, or Firm* — Loza & Loza, LLP; Jessica Smith

(57) ABSTRACT

A linear motor includes a stator and a rotor that is axially moveable relative to the stator, wherein the rotor is permanently excited by a rotor magnetic field which is periodic with a first period length (PP) along its longitudinal axis, wherein the linear motor comprises a position detection device, which is designed to detect a position of the rotor in relation to the stator, wherein the position detection device comprises at least a first magnetic field sensor (S1) and a second magnetic field sensor (S2), wherein the first magnetic field sensor (S1) and the second magnetic field sensor (S2) are arranged on the stator spaced apart from each other by a first distance (d1) along the longitudinal axis of the rotor, wherein the first distance (d1) is at least approximately an odd multiple of one-sixth of the first period length (PP).

20 Claims, 3 Drawing Sheets

LINEAR MOTOR AND OPERATING METHOD THEREOF

CROSS REFERENCE TO RELATED APPLICATIONS

The present application claims priority under 35 U.S.C. § 119(a) to German Application No. DE 10 2018 105 118.2 filed in Germany and entitled, "Linear Motor and Operating Method Thereof," filed Mar. 6, 2018, and hereby expressly incorporated by reference herein.

FIELD

This application relates to a system and method of a linear motor, and in particular, a system and method for a linear motor including a stator, a rotor and a position detection device configured to detect a position of the rotor in relation to the stator.

BACKGROUND

Conventional linear motors having rotors excited by a permanent magnet generally have a plurality of permanent magnets arranged along a longitudinal axis of the rotor, if necessary with spacers arranged in between to create a predefinable distance between adjoining permanent magnets. Depending on the magnetization and distance of the permanent magnets from each other, it can happen that signals, which are detectable by means of magnetic field sensors and characterize a position of the rotor, have non-linear distortion. This is the case particularly when the magnet arrangement in the rotor is optimized for the greatest possible power density, and not for the most sine-shaped sensor signal of the magnetic field sensors for example. The non-linear distortion limits the precision for determining the position of the rotor.

Therefore, one of the objects of the present embodiments is to improve a linear motor of the aforementioned type and an operating method for a linear motor in such a way that the previously mentioned disadvantages are mitigated or even avoided.

SUMMARY

One or more of the embodiments herein relates to a linear motor, having a stator and a rotor that is axially moveable relative to the stator, wherein the rotor is permanently excited by a rotor magnetic field which is periodic with a first period length along its longitudinal axis, wherein the linear motor has a position detection device, which is designed to detect a position of the rotor in relation to the stator. The embodiments herein also relate to a method for operating such a linear motor.

For a linear motor of the aforementioned type, this object is achieved in that the position detection device has at least one first magnetic field sensor and a second magnetic field sensor, wherein the first magnetic field sensor and the second magnetic field sensor are arranged on the stator spaced apart from each other by a first distance along the longitudinal axis of the rotor, wherein the first distance is at least approximately an odd multiple of one-sixth of the first period length. This enables to precisely determine the position of the rotor, wherein in particular the aforementioned non-linear distortion can be effectively compensated. According to tests conducted by applicant, the proposed first distance can compensate in particular for a third harmonic interference effect. The first distance of, for example, one-sixth of the period length of the periodic rotor magnetic field corresponds to a phase shift of 180° of the third harmonic so that the latter can be compensated by taking into account the output signals of the first and second magnetic field sensors.

In some embodiments, the first period length is approx. 1 cm to approx. 15 cm, for example.

In some embodiments, the first distance is at least approximately (this means that deviations of approx. 20 percent maximum in relation to the period length are permissible) one sixth of the first period length. In other preferred embodiments, the first distance is preferentially exactly (this means that deviations of approx. 5 percent maximum in relation to the period length are permissible) one-sixth of the first period length.

In other embodiments, the first distance can also be, instead of one-sixth (⅙) of the first period length, a different odd multiple of the first period length, e.g., five-sixth (⅚) or seven-sixths (⅞), and so on.

In additional embodiments, at least a third magnetic field sensor is provided, wherein the first magnetic field sensor and the third magnetic field sensor are arranged on the rotor spaced apart to each other by a second distance along the longitudinal axis of the rotor, wherein the second distance is at least some odd multiple of one-quarter of the first period length. This allows for an even more exact determination of the position of the rotor. Preferably, the second distance is as close as possible to an odd multiple of one-quarter of the first period length, for example having a maximum deviation of approximately 5 percent in relation to the first period length.

In other embodiments, the position detection device has multiple groups of magnetic field sensors.

In other embodiments, the multiple groups of magnetic field sensors are preferentially arranged in an evenly distributed manner along a circumferential direction.

Other embodiments provide for three groups of magnetic field sensors, wherein the three groups of magnetic field sensors are spaced apart from each other by an angle of approximately 120 degrees in each case.

In other embodiments, each of the three groups has at least one additional magnetic field sensor and a second magnetic field sensor, wherein the first magnetic field sensor and the second magnetic field sensor are arranged on the stator spaced apart from each other by a first distance along the longitudinal axis of the rotor, wherein the first distance is at least some odd multiple of one-sixth of the first period length, wherein particularly the first distance is one-sixth of the first period length.

In other embodiments, each of the multiple groups is arranged on a same longitude coordinate in relation to the stator.

In other embodiments, the position detection device is designed to form a position signal characterizing the position of the rotor as a function of an output signal of the first magnetic field sensor and as a function of an output signal of the second magnetic field sensor.

In other embodiments, the position detection device is designed to combine, particularly to add, together the output signal of the first magnetic field sensor and the output signal of the second magnetic field sensor.

In other embodiments, at least one of the magnetic field sensors is a Hall sensor.

In other embodiments, the linear motor is designed to output a or the position signal, characterizing the position of the rotor, to an external unit using a serial data transmission protocol.

Further embodiments relate to a method of operating a linear motor having a stator and a rotor that is axially moveable relative to the stator, wherein the rotor is permanently excited by a rotor magnetic field which is periodic with a first period length along its longitudinal axis, wherein the linear motor has a position detection device, which is designed to detect a position of the rotor in relation to the stator, wherein the position detection device has at least a first magnetic field sensor and a second magnetic field sensor. The first magnetic field sensor and the second magnetic field sensor are arranged on the stator spaced apart from each other by a first distance along the longitudinal axis of the rotor, wherein the first distance is at least approximately an odd multiple of one-sixth of the first period length, wherein the position detection device forms a position signal characterizing the position of the rotor as a function of an output signal of the first magnetic field sensor and as a function of an output signal of the second magnetic field sensor.

Other embodiments provide that the position detection device combines, in particular adds, together the output signal of the first magnetic field sensor and the output signal of the second magnetic field sensor.

It is understood that the principle according to the embodiments may also be applied to such linear motors, whose rotors are not excited by permanent magnetics as described above, but have rotor windings through which current can pass, for example. In this case, permanent magnets may be provided for example in the stator.

Additional features, application possibilities and advantages of the invention are derived from the following description of embodiments of the invention, which are depicted in the figures of the drawing. All described or depicted features, by themselves or in any combination, thereby form the subject matter of the invention regardless of their combination in the claims or their reference as well as independent of their wording or representation in the description or drawing.

DETAILED DESCRIPTION

The word "exemplary" or "embodiment" is used herein to mean "serving as an example, instance, or illustration." Any implementation or aspect described herein as "exemplary" or as an "embodiment" is not necessarily to be construed as preferred or advantageous over other aspects of the disclosure. Likewise, the term "aspects" does not require that all aspects of the disclosure include the discussed feature, advantage, or mode of operation.

Embodiments will now be described in detail with reference to the accompanying drawings. In the following description, numerous specific details are set forth in order to provide a thorough understanding of the aspects described herein. It will be apparent, however, to one skilled in the art, that these and other aspects may be practiced without some or all of these specific details. In addition, well known steps in a method of a process may be omitted from flow diagrams presented herein in order not to obscure the aspects of the disclosure. Similarly, well known components in a device may be omitted from figures and descriptions thereof presented herein in order not to obscure the aspects of the disclosure.

Figure 1:
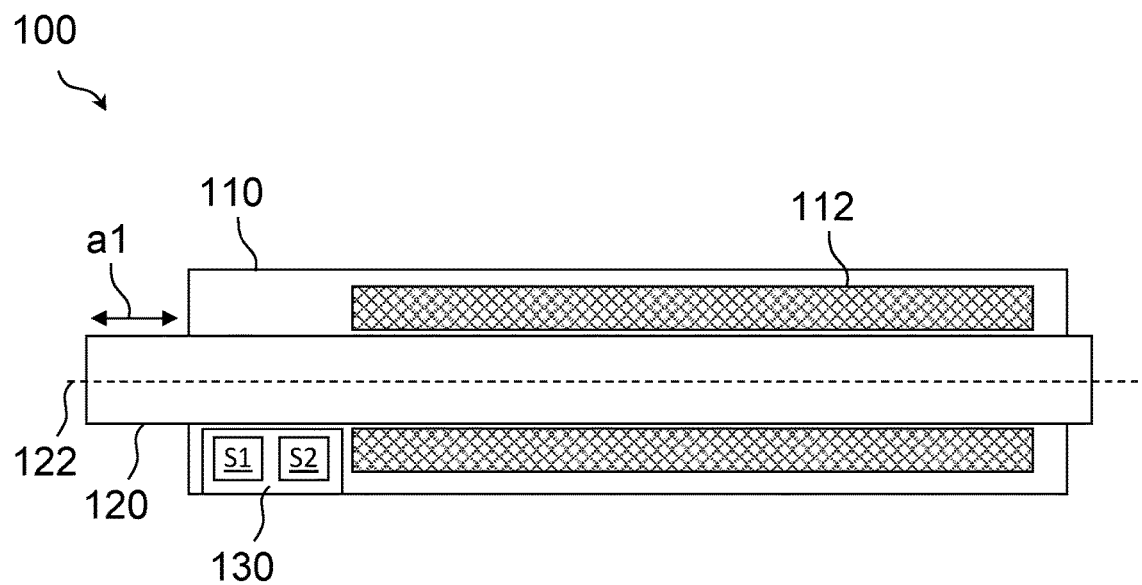
FIG. 1 schematically depicts a side view of a linear motor according to a first embodiment in a partial cross-section, FIG. 2 schematically depicts a rotor for a linear motor according to an embodiment, FIG. 3 schematically depicts operating variables of a linear motor according to other embodiments, FIG. 4 schematically depicts magnetic sensors of a position detection device according to other embodiments, FIG. 5 schematically depicts a position detection device according to other embodiments, FIG. 6A schematically depicts a side view of a rotor for a linear motor according to an additional embodiment, FIG. 6B schematically depicts a front view of the rotor according to FIG. 6A, FIG. 7 schematically depicts a simplified flow chart of an embodiment of the operating method according to the invention, and FIG. 8 schematically depicts a combination of signals according to an embodiment.

FIG. 1 schematically depicts a side view of a linear motor 100 according to a first embodiment in a partial cross-section. Linear motor 100 has an essentially hollow cylinder-shaped stator 110 and a rotor 120 arranged concentrically inside of it. Rotor 120 can be moved axially relative to stator 110, which is indicated by double-arrow al in FIG. 1. A longitudinal axis of rotor 120 is labeled with reference sign 122 in FIG. 1.

In the present case, stator 110 has one or more winding packages 112, comprising magnetic windings, which can have current flowing through them in a manner known per se, for entering into magnetic interaction with rotor 120, presently excited by a permanent magnet, and driving it within the meaning of a horizontal motion al in FIG. 1. Electrical connections or details of winding package or winding packages 112 are presently not shown for the sake of clarity.

In the present case, rotor 120 has a periodic rotor magnetic field along its longitudinal axis 122 (in other words, along the horizontal in FIG. 1), which has a first period length. Conventionally, the first period length, which is also referred to "pole pitch" in English, is less than the total length of rotor 120, so that the total length of the rotor 120 corresponds to a (not necessarily whole number) multiple of the first period length.

In addition, linear motor 100 has a position detection device 130, which is designed to detect a position of rotor 120 in relation to stator 110. The position information may be used for example to determine how far rotor 120 protrudes out of stator 110, and/or to control an operation of linear motor 100.

According to embodiments herein, it is provided that position detection device 130 has at least a first magnetic field sensor S1 and a second magnetic field sensor S2, wherein first magnetic field sensor S1 and second magnetic field sensor S1 are arranged on stator 110 spaced apart from each other by a first distance (not shown in FIG. 1) along longitudinal axis 122 of rotor 120, wherein the first distance is at least approximately an odd multiple of one-sixth of the first period length. This allows for a precise determination of the position of rotor 120, wherein particularly the non-linear distortion mentioned previously can be effectively compensated.

Figure 2:
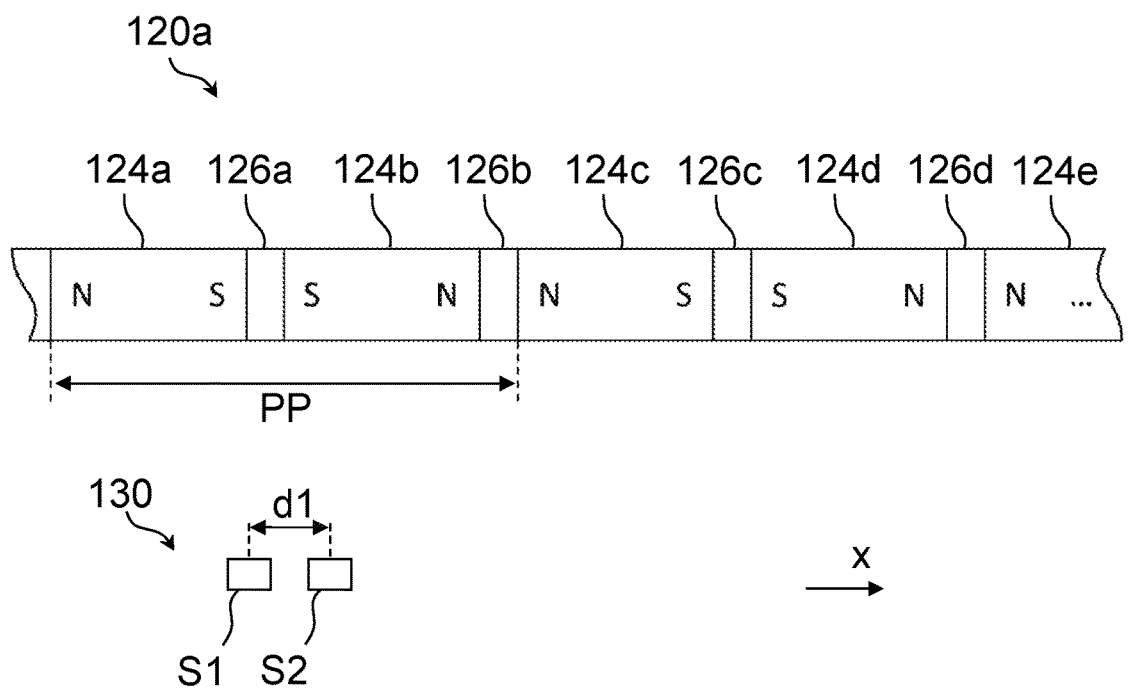

According to testing conducted by applicant, the proposed first distance in particular can compensate for a third harmonic interfering effect, which is created by a not purely sine-shaped or not purely cosine-shaped profile of the magnetic field strength along longitudinal axis 122 of rotor 120. To this end, FIG. 2 schematically shows a section of a rotor 120a for linear motor 100 (FIG. 1) according to an embodiment. For example, individual permanent magnets 124*a*, 124*b*, 124*c*, 124*d*, 124*e* of rotor 120*a* can be designed in terms of their generated magnetic field and be spaced apart by means of spacers 126*a*, 126*b*, 126*c*, 126*d* in such a manner that a not purely sine-shaped profile of the magnetic field strength results along longitudinal axis 122 of rotor 120*a* (cf. coordinate axis x) parallel to it, from FIG. 2. The first period length of rotor 120*a* is marked with double-arrow PP in FIG. 2, and the magnetic poles (north pole, south pole) of the individual permanent magnets 124*a*, 124*b*, 124*c*, 124*d*, 124*e* are marked here with the letters "N," "S." In addition, FIG. 2 symbolically shows the two magnetic field sensors S1, S2 already mentioned earlier of position detection device 130 in their first distance d1 to each other, which are arranged for example on stator 110 (FIG. 1), preferably radially inside in the vicinity of an exterior surface of rotor 120, 120*a*.

Figure 3:
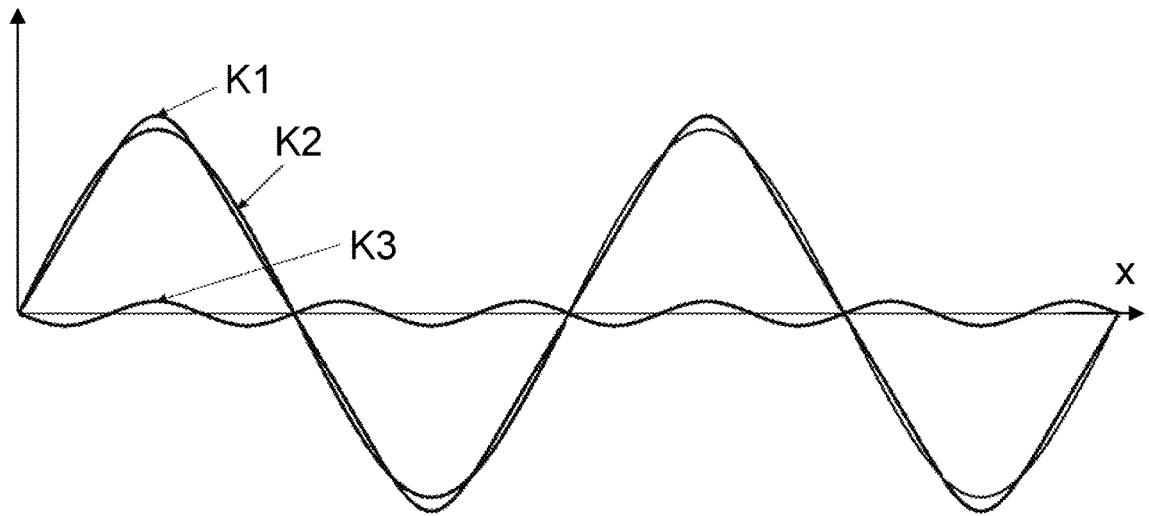

The not purely sine-shaped profile, described here for illustrative purposes, of the magnetic field strength along longitudinal axis 122 or coordinate axis x of rotor 120*a* is depicted in the diagram of FIG. 3 by curve K1. Curve K2 shows an optimal, purely sine-shaped profile in relation to the position determination by means of magnetic sensors S1, S2, which evaluate the magnetic field of rotor 120*a* (FIG. 2). If the rotor magnetic field were to have the purely sine-shaped profile K2 according to FIG. 3, then an also essentially purely sine-shaped signal would be generated in the magnetic field sensors, given a motion of rotor 120*a* relative to stator 110, and thus to the sensors arranged on stator 110, which allows for a particularly precise determination of the position of rotor 120*a*.

However, in preferred embodiments, the rotor magnetic field (considered along longitudinal axis 122 of the rotor), e.g., for optimizing the performance density of linear motor 100 by selecting and arranging permanent magnets 124*a*, . . . , 124*e* (FIG. 2), can be intentionally designed to deviate from the pure sine shape, for example corresponding to curve K1 according to FIG. 3, which can essentially be considered as a superposition of the purely sine-shaped fundamental harmonic, cf. curve K2, and the third harmonic, cf. curve K3. In this case, in magnetic field sensors S1, S2 given a motion of rotor 120*a* relative to stator 110 and thus to sensors S1, S2 arranged on stator 110, a signal essentially corresponding to the profile of curve K1 would be generated, which is thus not free from harmonics, and in this case also has particularly portions of the third harmonic in addition to the fundamental harmonic. This would result in limited precision in determining the position of rotor 120*a*. All the same, curve K1 for example also involves a periodic rotor magnetic field.

The precedingly described undesired effect may be advantageously compensated for by the inventive specification regarding first distance d1 (FIG. 2) between first magnetic field sensor S1 and second magnetic field sensor S2. First distance d1, for example one-sixth of the first period length PP of the periodic rotor magnetic field, corresponds to a phase shift of third harmonic K3 (FIG. 3) of 180° (degrees), so that it can be compensated for by taking into account the output signals of first and second magnetic field sensors S1, S2 (FIG. 2).

In preferred embodiments, first distance d1 is at least approximately (deviations of approx. 20 percent maximum in relation to first period length PP are permissible) one-sixth of the period length PP. In other preferred embodiments, first distance d1 is preferentially exactly (deviations of approx. 5 percent maximum in relation to first period length PP are permissible) one-sixth of first period length PP.

In other embodiments, first distance d1 can also be a different odd multiple (particularly 5, 7, . . . ) of the first period length PP, e.g., five-sixth (⅚) or seven-sixth (⅞) and so on, instead of one-sixth (⅙) of the first period length PP.

Figure 4:
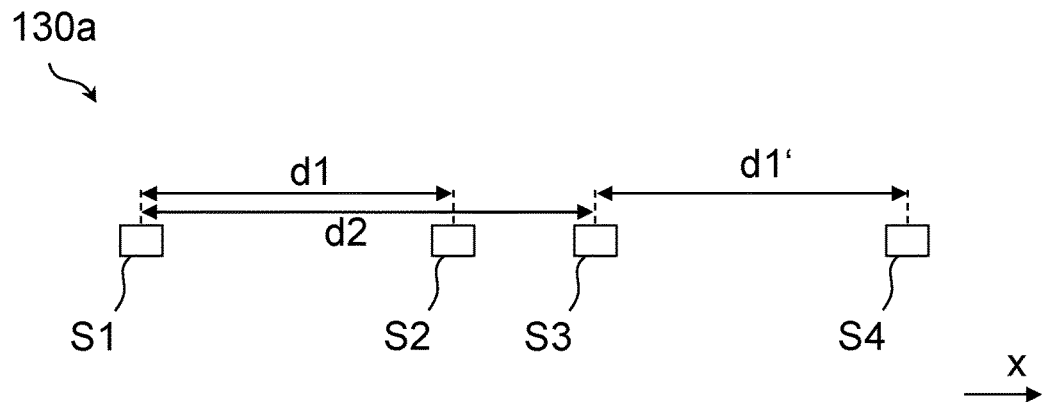

In other embodiments 130*a* of the position detection device (cf. FIG. 4), at least a third magnetic field sensor S3 is provided, wherein first magnetic field sensor S1 and third magnetic field sensor S3 are arranged on the stator spaced apart from each other at a second distance d2 along longitudinal axis x of rotor 120*a* (FIG. 2), wherein second distance d2 is at least some odd multiple of one-fourth of first period length PP (FIG. 2). An even more precise determination of the position of rotor 120*a* is thereby made possible. Preferably, second distance d2 is as close as possible to an odd multiple of one-quarter of first period length PP, for example having a maximum deviation of approx. 5 percent in relation to first period length PP.

Other embodiments may provide for a fourth magnetic field sensor S4, which is arranged at a distance d1' to magnetic field sensor S3, comparable to first distance d1 between magnetic field sensors S1, S2. In this way, for signals of magnetic field sensors S3, S4, one can compensate for the undesired harmonics of the third harmonic.

Figure 5:
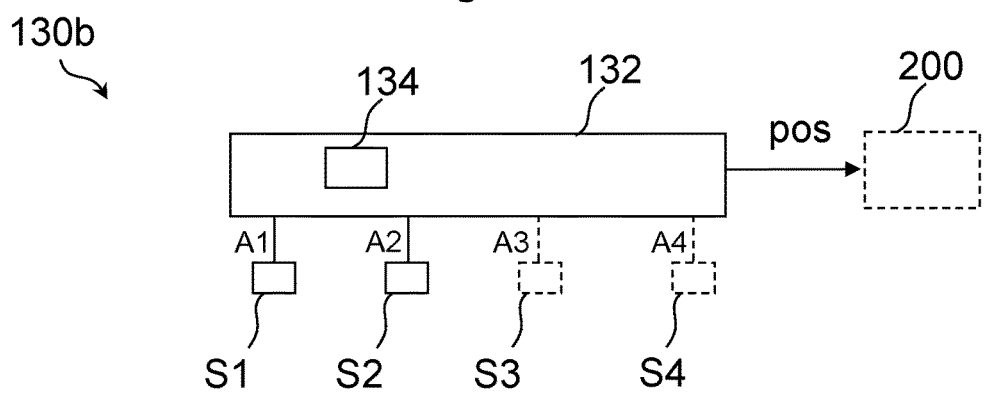

FIG. 5 schematically depicts a position detection device 130*b* according to additional embodiments. An evaluation device 132, which may be for example a hardware circuit or a combination of hardware and software, receives output signals A1, A2 at least of first magnetic field sensor S1 and second magnetic field sensor S2. The two output signals A1, A2 are combined, in particular added, together in combining unit 134. Third harmonic portions, cf. Curve K3 in FIG. 3, contained in output signals A1, A2 thereby compensate each other because magnetic field sensors S1, S2 have inventive first distance d1 to each other along longitudinal axis 122 of rotor 120*a* (FIG. 2). An output signal of adder 134 may be output in the form of position signal pos (FIG. 5) characterizing the position of rotor 120*a* (FIG. 2) by position detection device 130*b* to an external unit 200.

Optionally, position detection device 130*b* can also receive output signals A3, A4 of other magnetic field sensors S3 and S4 and process these output signals A3, A4 in a comparable manner, for example by adding them together using adder 134. In this embodiment, the sum signal obtained from output signals A1, A2 can be outputted, for example as a first position signal ("sine signal"), and the sum signal obtained from output signals A3, A4 can be outputted, for example as a second position ("cosine signal"), to the external unit.

In some embodiments, a voltage divider (not depicted, cf. FIG. 8) can advantageously be used as a combining unit to combine relevant output signals A1, A2 or A3, A4.

Figure 6A:
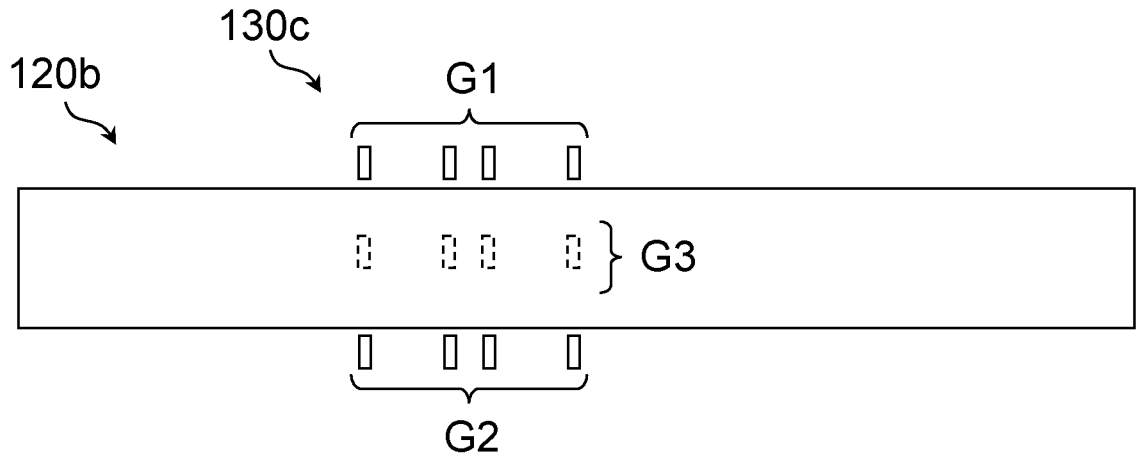

In other embodiments, position detection device 130*c* has multiple groups G1, G2, G3 of magnetic field sensors about rotor 120*b*, cf. FIG. 6A. For the sake of clarity, individual magnetic field sensors are not labeled separately in FIG. 6A, and a rotor is also not depicted. Here, every group G1 G2, G3 comprises for example four magnetic field sensors, e.g., in the configuration according to FIG. 4.

Figure 6B:
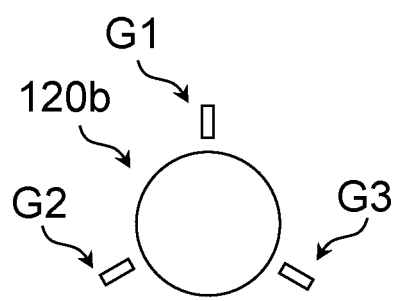

In other embodiments, multiple groups G1, G2, G3 are preferentially arranged so as to be evenly distributed along a circumferential direction of rotor 120*b*, as one can see in this case in FIG. 6B. One can thereby advantageously compensate for radial flaws and/or flaws in relation to the circumference of permanent magnets 124*a*, . . . , 124*e* (FIG. 2) of rotor 120*b*, for example by averaging among the respective output signals of different groups.

Other embodiments provide for three groups G1, G2, G3 of magnetic field sensors, wherein the three groups of magnetic field sensors are in each case spaced apart by an angle of approx. 120 degrees.

In other embodiments, each of the three groups G1, G2, G3 has at least one first magnetic field sensor S1 (FIG. 2) and a second magnetic field sensor S2, wherein first magnetic field sensor S1 and second magnetic field sensor S2 are arranged on stator 110 (FIG. 1) spaced apart from each other by a first distance d1 (FIG. 2) along longitudinal axis 122 of rotor 120a, 120b, wherein first distance d1 is at least approx. an odd multiple of one-sixth of first period length PP (FIG. 2), wherein in particular first distance d1 is one-sixth of the first period length PP.

In other embodiments, each of the multiple groups G1, G2, G3 (FIG. 6A) is arranged on a same longitudinal coordinate in relation to stator 110 (FIG. 1).

In other embodiments, position detection device 130, 130a, 130b is designed to form a position signal pos characterizing the position (FIG. 5) of rotor 120, 120a, 120b as a function of an output signal A1 of first magnetic field sensor S1 and as a function of output signal A1 of second magnetic field sensor S2.

In other embodiments, position detection device 130b is designed to combine, in particular add, together output signal A1 of first magnetic field sensor S1 and output signal A2 of second magnetic field sensor S2.

In other embodiments, at least one of the magnetic field sensors S1, S2, S3, S4 is a Hall sensor. Preferentially, all magnetic field sensors are designed identically as Hall sensors.

In other embodiments, linear motor 100 (FIG. 1) is designed to output a position signal pos (FIG. 5), characterizing for example the position of rotor 120, 120a, 120b, to an external unit 200 using a serial data processing protocol.

Additional embodiments relate to a method for operating a linear motor 100 having a stator 110 (FIG. 1) and a rotor 120 that is axially moveable relative to stator 110, wherein rotor 122 is permanently excited by a periodic rotor magnetic field having a first period length PP along its longitudinal axis 122, wherein linear motor 100 comprises a position detection device 130, which is designed to detect a position of rotor 120 in relation to stator 110, wherein position detection device 130 comprises at least a first magnetic field sensor S1 and a second magnetic field sensor S2, wherein first magnetic field sensor S1 and second magnetic field sensor S2 are arranged on stator 110 spaced apart from each other by a first distance d1 (FIG. 2) along longitudinal axis 122 of rotor 120a, wherein first distance d1 is at least approx. an odd multiple of one-sixth of first period length PP, wherein position detection device 130 forms a position signal pos (FIG. 5), characterizing the position of rotor 120a, as a function of an output signal A1 of first magnetic field sensor S1 and as a function of an output signal A2 of second magnetic field sensor S2.

Figure 7:
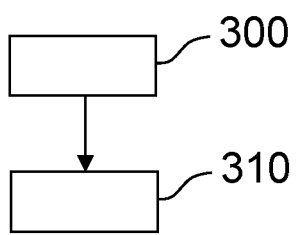

In this regard, FIG. 7 shows a simplified flow chart. In step 300, position detection device 130b (FIG. 5) receives an output signal A1 from first magnetic field sensor S1 and an output signal A2 from second magnetic field sensor S2. In step 310, position detection device 130b forms position signal pos characterizing the position of rotor 120a as a function of output signals A1, A2, or example by combining or adding them.

Figure 8:
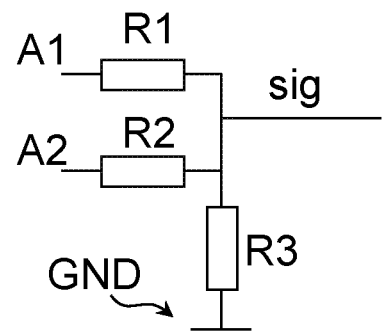

FIG. 8 schematically depicts a combination of output signals A1, A2 of magnetic field sensors S1, S2 according to an embodiment by means of which a resistance circuit comprising a first resistor R1, a second resistor R2, and optionally a third resistor R3, which is here switched against a reference potential, particularly ground potential GND. The resistance circuit executes an addition of output signals A1, A2 according to preferred embodiments and provides signal sig compensated by the third harmonic, said signal characterizing the position of rotor 120a in a manner comparable to the precedingly described signal pos with reference to FIG. 7. Preferably, first resistor R1 and second resistor R2 have the same resistance values. The optionally provided third resistor may preferably also have a same resistance value as the two resistors R1, R2, or it may also be omitted in other embodiments.

It is understood that the principle according to the embodiments may also be applied to those linear motors, whose rotors are not excited by permanent magnets, but comprise rotor windings that can have current flowing through them, for example. In this case, permanent magnets may be provided for example in the stator of the linear motor.

The principle according to the embodiments allows for the removal or compensation of harmonic distortion from output signals A1, A2, A3, A4 of magnetic field sensors S1, S2, S3, S4 of a linear motor 100, and thus a particularly precise determination of the position of a rotor 120, 120a, 120b of linear motor 100.

As may be used herein, the term "operable to" or "configurable to" indicates that an element includes one or more of components, circuits, instructions, modules, data, input(s), output(s), etc., to perform one or more of the described or necessary corresponding functions and may further include inferred coupling to one or more other items to perform the described or necessary corresponding functions.

Note that the aspects of the present disclosure may be described herein as a process that is depicted as a schematic, a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

The various features of the disclosure described herein can be implemented in different systems and devices without departing from the disclosure. It should be noted that the foregoing aspects of the disclosure are merely examples and are not to be construed as limiting the disclosure. The description of the aspects of the present disclosure is intended to be illustrative, and not to limit the scope of the claims. As such, the present teachings can be readily applied to other types of apparatuses and many alternatives, modifications, and variations will be apparent to those skilled in the art.

In the foregoing specification, certain representative aspects of the invention have been described with reference to specific examples. Various modifications and changes may be made, however, without departing from the scope of the present invention as set forth in the claims. The specification and figures are illustrative, rather than restrictive, and modifications are intended to be included within the scope of the present invention. Accordingly, the scope of the disclosure should be determined by the claims and their legal equivalents rather than by merely the examples described. For example, the components and/or elements recited in any apparatus claims may be assembled or otherwise operationally configured in a variety of permutations and are accordingly not limited to the specific configuration recited in the specification.

Furthermore, certain benefits, other advantages and solutions to problems have been described above with regard to particular embodiments; however, any benefit, advantage, solution to a problem, or any element that may cause any particular benefit, advantage, or solution to occur or to become more pronounced are not to be construed as critical, required, or essential features or components of any or all the claims.

As used herein, the terms "comprise," "comprises," "comprising," "having," "including," "includes" or any variation thereof, are intended to reference a nonexclusive inclusion, such that a process, method, article, composition or apparatus that comprises a list of elements does not include only those elements recited, but may also include other elements not expressly listed or inherent to such process, method, article, composition, or apparatus. Other combinations and/or modifications of the above-described structures, arrangements, applications, proportions, elements, materials, or components used in the practice of the present invention, in addition to those not specifically recited, may be varied or otherwise particularly adapted to specific environments, manufacturing specifications, design parameters, or other operating requirements without departing from the general principles of the same.

Moreover, reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

The invention claimed is:

1. A linear motor, comprising:
a stator;
a rotor that is axially moveable relative to the stator, wherein the rotor is permanently excited by a rotor magnetic field that is periodic with a first period length (PP) along a longitudinal axis; and
a position detection device configured to detect a position of the rotor in relation to the stator, wherein the position detection device comprises:
at least a first magnetic field sensor (S1) and a second magnetic field sensor (S2), wherein the first magnetic field sensor (S1) and the second magnetic field sensor (S2) are arranged radially inside the stator spaced apart from each other by a first distance (d1) along the longitudinal axis of the rotor or within a 20 percent deviation of the first distance (d1) along the longitudinal axis of the rotor, wherein the first distance (d1) is an odd multiple of one-sixth of the first period length (PP).

2. The linear motor of claim 1, wherein the first distance (d1) is one-sixth of the first period length (PP).

3. The linear motor of claim 1, further comprising:
at least a third magnetic field sensor, wherein the first magnetic field sensor (S1) and the third magnetic field sensor (S3) are arranged on the stator spaced apart from each other by a second distance (d2) along the longitudinal axis of the rotor or within a 20 percent deviation of the second distance (d2) along the longitudinal axis of the rotor, wherein the second distance (d2) is an odd multiple of one-quarter of the first period length (PP).

4. The linear motor of claim 1, wherein the position detection device comprises a plurality of groups of magnetic field sensors, wherein each group of the plurality of groups of magnetic field sensors includes a different set of at least the first magnetic field sensor (S1) and the second magnetic field sensor (S2).

5. The linear motor of claim 4, wherein the plurality of groups of magnetic field sensors are arranged so as to be evenly distributed along a circumferential direction of the rotor.

6. The linear motor of claim 5, wherein the position detection device comprises three groups (G1, G2, G3) of magnetic field sensors, wherein the three groups (G1, G2, G3) of magnetic field sensors are spaced apart from each other by approximately 120 degrees in each case.

7. The linear motor of claim 6, wherein each of the three groups of magnetic field sensors comprises a different set of the at least first magnetic field sensor (S1) and the second magnetic field sensor (S2) arranged on the stator spaced apart by the first distance (d1) along the longitudinal axis of the rotor or within a 20 percent deviation of the first distance (d1) along the longitudinal axis of the rotor, wherein the first distance (d1) is an odd multiple of one-sixth of the first period length (PP) or wherein the first distance (d1) is one-sixth of the first period length (PP).

8. The linear motor of claim 4, wherein each group of the plurality of groups of magnetic field sensors is arranged on a same longitude coordinate in relation to the stator.

9. The linear motor of claim 1, wherein the position detection device is configured to obtain a position signal characterizing the position of the rotor as a function of an output signal (A1) of the first magnetic field sensor (S1) and as a function of an output signal (A2) of the second magnetic field sensor (S2).

10. The linear motor of claim 9, wherein the position detection device is configured to combine the output signal (A1) of the first magnetic field sensor (S1) and the output signal (A2) of the second magnetic field sensor (S2) to obtain the position signal.

11. The linear motor of claim 9, wherein the linear motor is configured to output the position signal characterizing the position of the rotor using a serial data transmission protocol to an external unit.

12. The linear motor of claim 1, wherein at least one of the first and second magnetic field sensors (S1, S2) is a Hall sensor.

13. A linear motor, comprising:
a stator;
a rotor configured to axially move relative to the stator, wherein the rotor is excited by a rotor magnetic field that is periodic with a first period length (PP) along a longitudinal axis of the rotor; and
a position detection device configured to detect a position of the rotor in relation to the stator, wherein the position detection device includes:
a first magnetic field sensor and a second magnetic field sensor, wherein the first magnetic field sensor and the second magnetic field sensor are arranged on the stator along the longitudinal axis of the rotor with a first distance (d1) therebetween or within a 20 percent deviation from the first distance (d1) therebetween, wherein the first distance (d1) is one-sixth of the first period length PP.

14. The linear motor of claim 13, wherein the rotor comprises a plurality of permanent magnets arranged to generate the rotor magnetic field corresponding to a curve K1, wherein the curve K1 is an approximate superposition of a first sine-shaped fundamental harmonic and a third harmonic with the first period length (PP) along the longitudinal axis of the rotor.

15. The linear motor of claim 14, wherein the position detection device further comprises:
   an evaluation device that combines an output signal of the first magnetic field sensor and an output signal of the second magnetic field sensor and generates a position signal that indicates a position of the rotor.

16. The linear motor of claim 13, wherein the first distance (d1) is at least one of: one-sixth of the first period length PP (⅙PP length); within a 20 percent deviation of the ⅙PP length; or an odd multiple of one-sixth of the first period length (PP).

17. The linear motor of claim 13, wherein the first magnetic field sensor and the second magnetic field sensor are arranged on the stator along the longitudinal axis of the rotor with the first distance (d1) therebetween or within a 5 percent deviation from the first distance (d1) therebetween, wherein the first distance (d1) is one-sixth of the first period length PP.

18. A linear motor, comprising:
   a stator;
   a rotor that is axially moveable relative to the stator, wherein the rotor is permanently excited by a rotor magnetic field that is periodic with a first period length (PP) along a longitudinal axis; and
   a position detection device configured to detect a position of the rotor in relation to the stator, wherein the position detection device comprises:
      at least a first magnetic field sensor (S1) and a second magnetic field sensor (S2) arranged radially inside the stator, wherein the first magnetic field sensor (S1) and the second magnetic field sensor (S2) are spaced apart from each other by a first distance (d1) along the longitudinal axis of the rotor or within a 20 percent deviation of the first distance (d1) along the longitudinal axis of the rotor, wherein the first distance (d1) is one-sixth of the first period length (PP) or another odd multiple of one-sixth of the first period length (PP); and
      an evaluation device that obtains a position signal characterizing the position of the rotor as a function of an output signal (A1) of the first magnetic field sensor (S1) and an output signal (A2) of the second magnetic field sensor (S2).

19. The linear motor of claim 18, wherein the rotor comprises a plurality of permanent magnets arranged to generate the rotor magnetic field corresponding to a curve K1, wherein the curve K1 is an approximate superposition of a first sine-shaped fundamental harmonic and a third harmonic with the first period length (PP) along the longitudinal axis of the rotor.

20. The linear motor of claim 18, wherein the evaluation device is configured to combine the output signal (A1) of the first magnetic field sensor (S1) and the output signal (A2) of the second magnetic field sensor (S2) to obtain the position signal.

* * * * *